United States Patent
Moore et al.

(10) Patent No.: US 9,160,938 B2
(45) Date of Patent: *Oct. 13, 2015

(54) SYSTEM AND METHOD FOR GENERATING THREE DIMENSIONAL PRESENTATIONS

(75) Inventors: John S. Moore, Middleton, WI (US); Victor W. Marsh, Fitchburg, WI (US); Richard T. Daly, Madison, WI (US)

(73) Assignee: WSI Corporation, Andover, MA (US)

( * ) Notice: Subject to any disclaimer, the term of this patent is extended or adjusted under 35 U.S.C. 154(b) by 1051 days.

This patent is subject to a terminal disclaimer.

(21) Appl. No.: 13/085,104

(22) Filed: Apr. 12, 2011

(65) Prior Publication Data
US 2011/0249090 A1 Oct. 13, 2011

Related U.S. Application Data

(60) Provisional application No. 61/323,123, filed on Apr. 12, 2010.

(51) Int. Cl.
| | |
|---|---|
| *H04N 13/00* | (2006.01) |
| *H04N 5/262* | (2006.01) |
| *G06T 19/00* | (2011.01) |

(52) U.S. Cl.
CPC ............... *H04N 5/262* (2013.01); *G06T 19/00* (2013.01); *G06T 19/006* (2013.01)

(58) Field of Classification Search
CPC . H04N 13/0488; H04N 13/044; H04N 5/262; G06T 19/00; G06T 19/006; G02B 27/01
USPC ....................................... 348/43, 46, E13.064
See application file for complete search history.

(56) References Cited

U.S. PATENT DOCUMENTS

| | | | | |
|---|---|---|---|---|
| 6,335,765 | B1 * | 1/2002 | Daly et al. | 348/586 |
| 6,961,061 | B1 * | 11/2005 | Johnson et al. | 345/473 |
| 2002/0030675 | A1 * | 3/2002 | Kawai | 345/204 |
| 2006/0001668 | A1 * | 1/2006 | Johnson et al. | 345/473 |
| 2007/0279494 | A1 * | 12/2007 | Aman et al. | 348/169 |
| 2008/0074494 | A1 * | 3/2008 | Nemethy et al. | 348/143 |

* cited by examiner

*Primary Examiner* — Mohammed Rahaman
(74) *Attorney, Agent, or Firm* — Meunier Carlin & Curfman LLC

(57) ABSTRACT

A virtual three-dimensional presentation in accordance with the present invention includes three stereoscopic layers, a stereoscopic background layer, a stereoscopic video insert layer, and a stereoscopic three-dimensional foreground layer. A surface, the Z-sphere, is defined in the virtual three-dimensional space of the three-dimensional scene with reference to the aim point, the distance between the cameras, and the distance from the camera of the video scene, of a virtual stereoscopic camera looking at the three-dimensional scene being created. The separation of the virtual stereoscopic camera lens and distance to the aim point are set based on the stereoscopic cameras that are creating the video insert layer. The stereoscopic three-dimensional foreground layer scene may include a key which defines the transparency of objects in the foreground layer. The stereoscopic video insert layer may be generated by positioning a presenter, or other object, in a chroma-key set which is captured with a stereoscopic camera. The stereoscopic video insert layer may be distorted before being composited with the background and foreground such that elements of the stereoscopic video appear to move across a three-dimensional floor of the stereoscopic three-dimensional scene.

20 Claims, 7 Drawing Sheets

SYSTEM AND METHOD FOR GENERATING THREE DIMENSIONAL PRESENTATIONS

CROSS-REFERENCE TO RELATED APPLICATIONS

This application claims the benefit of U.S. Provisional Application No. 61/323,123, filed Apr. 12, 2010, and incorporated herein in its entirety.

FIELD OF THE INVENTION

The present invention pertains generally to chroma-key and virtual set technology and in particular to systems and methods for generating multi-layer virtual presentations incorporating three-dimensional graphics or animations with a live or pre-recorded two-dimensional video image of a presenter or other object positioned between foreground and background layers of the three-dimensional image.

BACKGROUND OF THE INVENTION

Television news and, in particular, weather broadcasts, commonly employ chroma-key or virtual set technology as part of the news and/or weather presentation. Such technology enables a presenter in a studio to appear as if he is in a more complex environment. Using this technology, scenes including images from a number of image sources, such as live video and computer graphics, can be created and combined together into a three-dimensional virtual presentation.

In many television programs which are broadcast from television studios, live video is combined with background images which were prepared in advance. The typical technology employed to create such combined images is called "chroma-key". The background images used in this technology can be still photographs, videotaped material, computer generated graphics, or any other image or compilation of images.

In generating a presentation using chroma-key technology, a presenter (the news caster, weather forecaster, etc.) stands in front of a colored or patterned screen in the studio. A television camera shoots both the presenter (live video) and the screen. The resulting picture is then transferred to a chroma-keyer for processing. At the same time, a background picture from a different source (such as another camera, pre-taped video, or computer graphics) is transferred to the chroma-keyer.

Both pictures, the live and the background picture, are combined in the chroma-keyer and broadcast as one picture which shows the live video on top of or in front of the background. For example, the final result can be a weather forecaster standing in front of a computer generated virtual weather map which cannot be seen at all in the physical studio.

The chroma-keyer differentiates between the live video image of the presenter and the screen according to the pixels (picture elements). Wherever a pixel from the live video image of the presenter is identified, it is transferred to the combined broadcast picture. Wherever a pixel from the screen is identified, the appropriate pixel from the background is placed in its place in the broadcast picture. In this way, a new picture is created and broadcast using the background which was chosen.

Many broadcast or other video presentations involve the use of three-dimensional graphics or animations. In some situations, it is desirable to place live or pre-recorded two dimensional video elements into a three-dimensional scene that has been rendered by a computer. Chroma-keying and virtual set technology may be used to generate such a video presentation. For example, a multi-layer video presentation may be created where a first layer consists of a computer generated graphics background, a second layer includes live video, e.g., of a presenter, hiding parts of the first layer, and a third layer consists of additional computer graphics, hiding parts of both the first and second layers. The generation of such a three-dimensional multi-layer presentation is typically accomplished in real time. In order to accomplish this effect in real time and fully automatically, the location of live video objects, e.g., the presenter, in the virtual space must be known. The three-dimensional location of a live video object or presenter in the three-dimensional virtual space of a multi-layer video presentation to be generated may be derived using three cameras positioned in a triangle pointing to the center of a chroma-key stage, to capture the contour of the live video object or presenter from three different directions. One of the three video cameras may be designated the main camera. The virtual environment, or three-dimensional set database, is created using a computer. For each frame in the video, the virtual image is calculated according to the main camera position image. Each of the three cameras see the presenter as a two-dimensional image. After filtering out the screen background using a chroma-keyer, the contour image of the presenter remains. This shape represents the physical volume from the camera's point of view to the stage surface. By utilizing the inputs of all three cameras in the triangle, the approximate location of the presenter within the three-dimensional virtual image can be obtained using the cross-section of the overlapping volumes. The cross-section of the overlapping volumes represents the object volumetric image. By obtaining the presenter's three-dimensional volumetric shape, the depth location of the presenter on the stage can be obtained. The depth location allows a depth value (Z value) to be assigned to each pixel of the presenter's image. Once the depth location of the presenter in the set is known, it can be calculated which virtual objects will appear behind the presenter and which virtual objects will appear in front of him. Thus, a multi-layer video presentation may be generated.

Other techniques have also been developed for generating a three-dimensional multi-layer virtual presentation in a chroma-key/virtual set technology environment. However, all such systems typically involve generating the multi-layer presentation in real time by a host computer using two variables which are provided to the process in real time, the position and pointing direction of a video camera, and a position, in real three-dimensional space, of the presenter. The live presenter is placed in the chroma-key set, and the position information of the location of both the camera and the actor is fed in real time to a host computer, which generates a virtual three-dimensional scene. The rendered three-dimensional scene and the live video are then keyed together to form the multi-layer presentation.

Such real-time methods for generating multi-layer three-dimensional virtual presentations, combining a computer generated three-dimensional scene and a two-dimensional video image, have several significant limitations. All such current methods utilize a great deal of expensive hardware and software to insert two-dimensional video elements into the three-dimensional scene in real time (30 fps). Elaborate systems, such as that described above, are used to determine the location of a person in front of a chroma-key wall. The video of the person is then rendered into the three-dimensional scene in real time using high-end computer systems. Since the rendering of the virtual three-dimensional scene is done in real time, the quality of the rendered scene is limited.

For example, in the production of a live weather segment for broadcast news, it may be desired to render complex three-dimensional weather scenes. Even with high-end computers, however, the number of polygons (i.e., the complexity) in the three-dimensional scene that can be rendered in real time is limited to the rendering power of the computer. For this reason, extremely detailed and complex three-dimensional objects cannot be created. Furthermore, the complexity of the process described above for generating a multi-layer presentation combining a computer generated virtual three-dimensional scene and a live video presenter is difficult to control in the normally short production times typical of broadcast news. Also, in such systems, there is usually a delay of several frames through the system, which makes it difficult for the live presenter to match his movements to objects in the computer-generated virtual scene. The challenge is, therefore, how to include a two-dimensional video element into an extremely complex three-dimensional scene without the use of very expensive and elaborate hardware set-ups.

SUMMARY OF THE INVENTION

The present invention provides a virtual three-dimensional presentation in accordance with the present invention includes three stereoscopic layers, a stereoscopic background layer, a stereoscopic video insert layer, and a stereoscopic three-dimensional foreground layer. A surface, the Z-sphere, is defined in the virtual three-dimensional space of the three-dimensional scene with reference to the aim point, the distance between the cameras, and the distance from the camera of the video scene, of a virtual stereoscopic camera looking at the three-dimensional scene being created. The separation of the virtual stereoscopic camera lens and distance to the aim point are set based on the stereoscopic cameras that are creating the video insert layer. The stereoscopic three-dimensional foreground layer scene may include a key which defines the transparency of objects in the foreground layer. The stereoscopic video insert layer may be generated by positioning a presenter, or other object, in a chroma-key set which is captured with a stereoscopic camera. The stereoscopic video insert layer may be distorted before being composited with the background and foreground such that elements of the stereoscopic video appear to move across a three-dimensional floor of the stereoscopic three-dimensional scene.

Further objects, features, and advantages of the invention will be apparent from the following detailed description taken in conjunction with the accompanying drawings.

DETAILED DESCRIPTION OF THE INVENTION

The present invention provides a system and method for generating a high quality and complex virtual three-dimensional video presentation, including a live or recorded two-dimensional video component, without the use of expensive and elaborate hardware set-ups. The present invention will be described in detail herein with reference to the exemplary application thereof to the production of a virtual three-dimensional weather presentation for use in the live weather segment of a television news broadcast. However, it should be understood that the present invention is not limited to such applications, and may be employed in any application where a high-quality virtual three-dimensional video presentation is desired.

Figure 1:
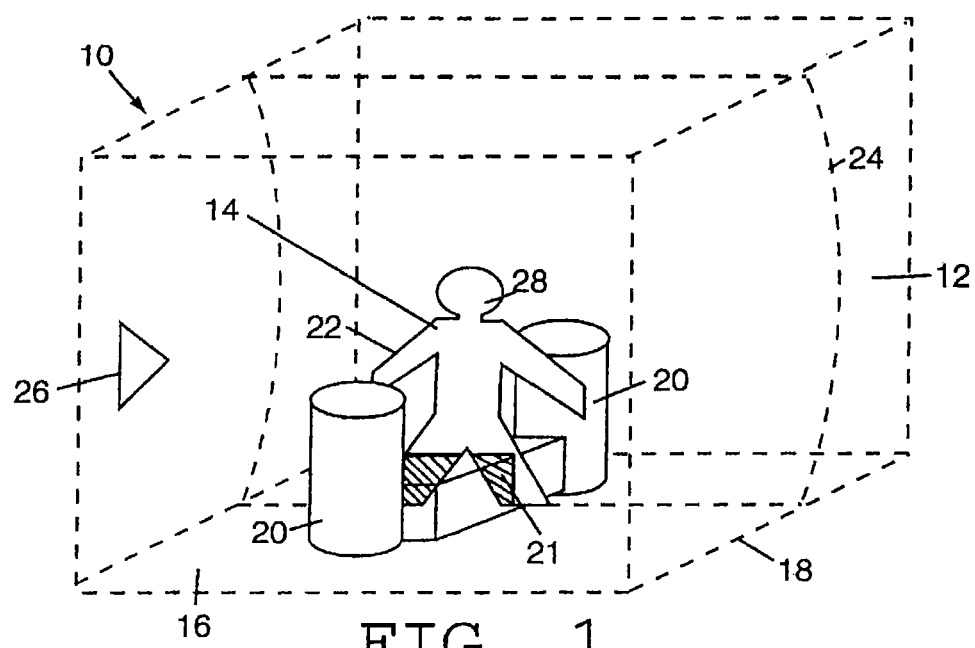
FIG. 1 is an exemplary illustration of a virtual three-dimensional presentation generated in accordance with the present invention.

An exemplary and highly illustrative virtual three-dimensional presentation which may be generated by a system and method in accordance with the present invention is illustrated at 10 in FIG. 1. The exemplary virtual three-dimensional presentation 10 includes three layers, a three-dimensional background scene layer 12, a two-dimensional video insert layer 14, and a three-dimensional foreground scene layer 16. The background 12 and foreground 16 form a virtual three-dimensional environment or scene 18 including computer-generated three-dimensional objects 20. As illustrated, the three-dimensional background 12 appears in the presentation 10 behind the two-dimensional video insert 14. The two-dimensional video insert 14 appears in front of the three-dimensional background 12 and behind the three-dimensional foreground 16. The three-dimensional foreground 16 appears in front of the three-dimensional background 12 and the two-dimensional video insert 14. Objects in the three-dimensional foreground 16 may be rendered so as to be entirely opaque or partially transparent to objects in the two-dimensional video insert layer 14 and background 12 behind the foreground 16. Thus, objects in the two-dimensional video insert layer 14 may be seen through transparent foreground objects 21 in the foreground 16.

A virtual three-dimensional presentation 10 generated in accordance with the present invention may present any type of video scene desired. For exemplary purposes only, the present invention is particularly applicable for use in live weather presentations. In such an application, for example, the background 12 may include a computer-generated three-dimensional map and animations of weather phenomena, e.g., clouds, the two-dimensional video insert layer 14 may include a presenter 22, who may move through the presentation 10, and the foreground layer 16 may include computer-generated three-dimensional animated weather phenomena, e.g., rain clouds, etc., which appear in front of the presenter 22 in the presentation 10. Of course, other scenes may form the background 12, live video 14, and foreground 16 layers.

Figure 2:
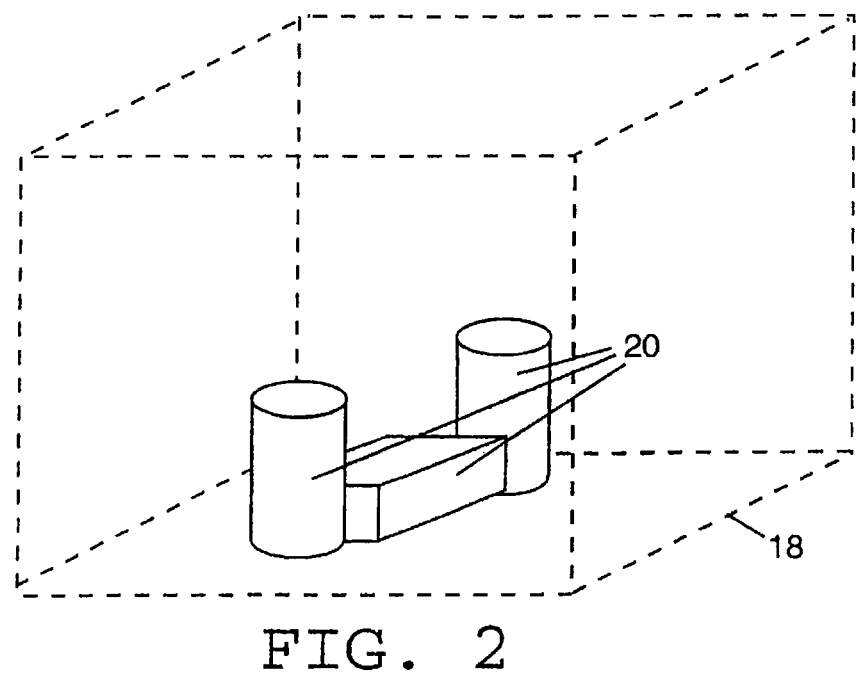
FIG. 2 is an exemplary illustration of a three-dimensional scene employed in generating a virtual three-dimensional presentation in accordance with the present invention.

In accordance with the present invention, conventional computer graphics systems may be employed to generate a very elaborate and detailed rendering of the virtual three-dimensional environment or scene 18, including computer-generated three-dimensional objects 20, as illustrated in FIG. 2. Depending upon the complexity and detail of the scene 18, this rendering process can take from minutes to hours to produce a finished scene. In accordance with the present invention, this rendering process can be accomplished in advance without impacting the presentation of the finished product at a later time. For example, if the present invention is employed for the production of a live weather presentation for broadcast news, in which a live presenter 22 moves through a three-dimensional weather scene 18, the detailed and complex three-dimensional maps and clouds that make up a forecast or satellite map for the three-dimensional scene 18 may be created well in advance of the broadcast of the presentation.

Figure 3:
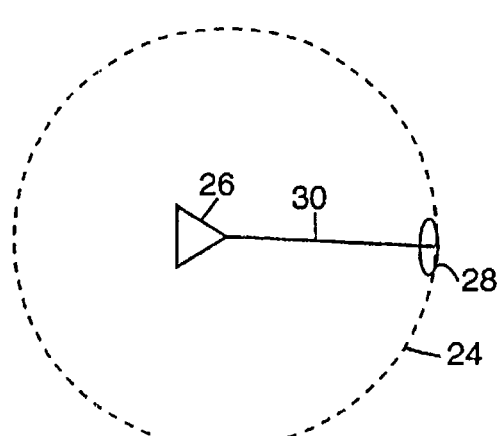
FIG. 3 is a schematic illustration of a Z-sphere surface employed in generating a virtual three-dimensional presentation in accordance with the present invention.

In accordance with the present invention, the two-dimensional video insert layer 14 is inserted into the computer-rendered three-dimensional scene 18 by defining in advance a surface in the three-dimensional space that is being rendered. This surface, referred to herein as the "Z-sphere" 24, is defined using a virtual camera 26, positioned in virtual space, and the aim point 28 of the virtual camera 24 that is looking at the virtual three-dimensional scene 18 that is being created. The Z-sphere is a three-dimensional surface that extends in all directions. (A two-dimensional representation of the Z-sphere is illustrated in FIG. 3.) The size of the Z-sphere is determined by the distance 30 from the virtual camera 26 to the aim point 28 in virtual space.

Figure 4:
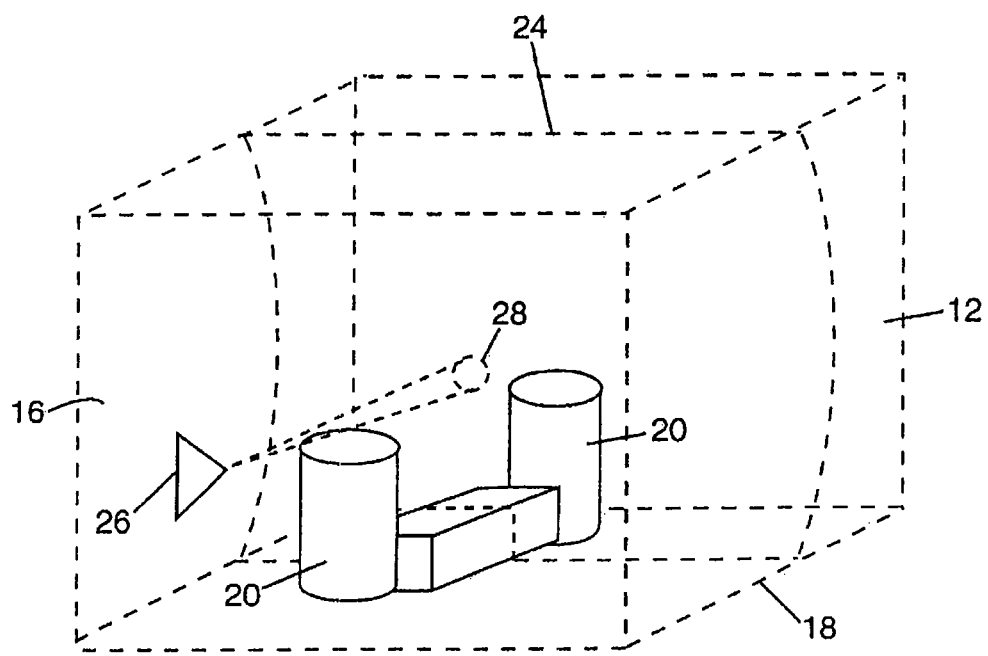
FIG. 4 is an exemplary illustration of the three-dimensional scene of FIG. 2 with a Z-sphere surface dividing the scene into three-dimensional background and foreground scenes.
Figure 5:
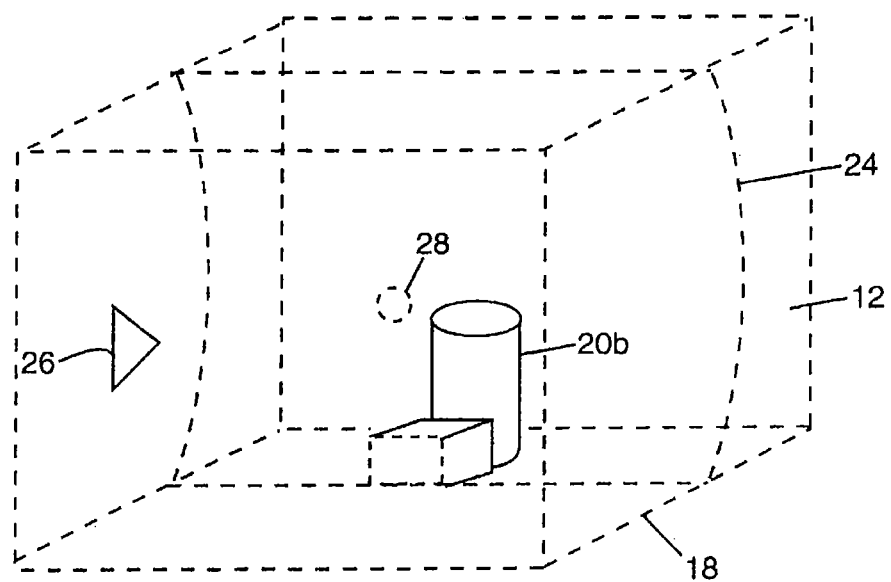
FIG. 5 is an exemplary illustration of the three-dimensional background scene of FIG. 4.
Figure 6:
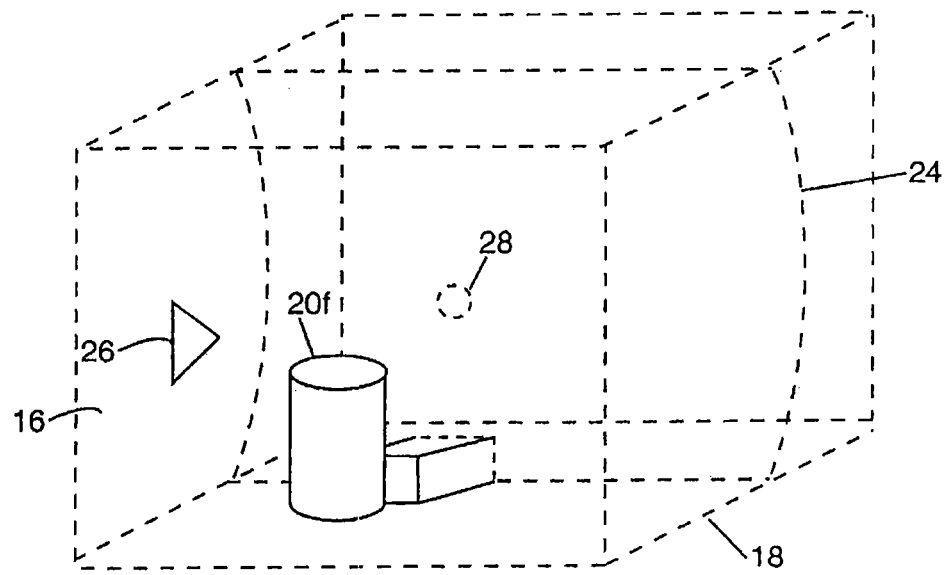
FIG. 6 is an exemplary illustration of the three-dimensional foreground scene of FIG. 4.

As illustrated in FIG. 4, the Z-sphere splits the three-dimensional scene 18 into two parts, the background 12 and the foreground 16. As illustrated in FIG. 5, the three-dimensional background 12 is that portion of the virtual three-dimensional scene 18 which is behind the Z-sphere surface 24, with respect to the virtual camera 26, which divides the scene into a section behind the Z-sphere surface and a section in front of the Z-sphere surface. As illustrated in FIG. 6, the three-dimensional foreground 16 is that portion of the virtual three-dimensional scene 18 which appears in front of the Z-sphere surface 24. Two-dimensional video objects in the two-dimensional video insert layer 14 will be positioned on the Z-sphere surface in the three-dimensional scene 18. Thus, objects 20b in the background 12 in the virtual three-dimensional scene 18 will appear behind objects 22 in the two-dimensional video insert layer 14, and objects 20f in the foreground 16 will appear in front of objects in the two-dimensional video insert layer 14.

In accordance with the present invention, in order to insert a two-dimensional video element into the three-dimensional scene 18, the three-dimensional background 12 is rendered separately from the three-dimensional foreground 16. The three-dimensional background scene 12 may be rendered in a conventional manner. For example, a complex and detailed animated three-dimensional scene showing developing weather or another scene may be generated by a computer and stored as analog or digital video in a conventional manner. Of course, any other type of three-dimensional video scene may be generated and/or recorded to form the scene for the three-dimensional background 12. Since the background scene 12 will be combined with two-dimensional video insert elements and the foreground scene 16 at a later time, to generate the complete virtual three-dimensional presentation 10, as long a time as is necessary can be taken to render the background scene 12, thereby making possible the rendering of a high-quality background scene 12 without the need for the most powerful and expensive computers. Furthermore, the background scene 12 may be rendered as multiple image objects or layers which are then composited together to form the complete background scene 12.

The three-dimensional foreground scene 16 may be generated in the same manner as the three-dimensional background scene 12. For example, the three-dimensional foreground scene 16 may include computer-generated three-dimensional animation of conventional weather objects, e.g., clouds, etc., passing through the virtual three-dimensional scene 18, or any other video scene. The foreground scene is time synchronized to the background scene in a conventional manner.

Some or all of the objects 20 or elements in the three-dimensional scene 18 may have some degree or form of transparency. This transparency allows objects to be seen through other objects in front of them, based on how transparent the objects in front are. For a two-dimensional video element 22 to be placed realistically into the three-dimensional video scene 18, it is important that such transparency look the way the human eye would expect it to. Thus, objects 22 in the two-dimensional video insert layer 14, positioned at the Z-sphere 24 in the complete virtual three-dimensional presentation 10, should be at least partially visible through transparent three-dimensional objects 21 in the three-dimensional foreground 16. This is important to preserve the realism of the final virtual three-dimensional presentation. Therefore, objects or elements 21 in the three-dimensional foreground scene 16 are assigned a key signal (image), during the process of rendering the foreground 16, which represents the transparency of three-dimensional foreground scene objects. For example, the key may be an 8-bit linear key defining foreground object transparency.

As with the three-dimensional background scene 12, since the three-dimensional foreground scene 16, including transparency key signal, is pre-rendered for combining with the background scene 12 and two-dimensional video insert layer 14 at a later time, to form the complete virtual three-dimensional presentation 10, as long a time as is necessary can be taken to render the foreground scene 16. Thus, a high-quality three-dimensional foreground scene 16 may be rendered without need for the most expensive and powerful computers. Furthermore, the foreground scene 16, like the background scene 12, may be rendered as multiple image objects or layers which are then composited together to form the complete foreground scene. The foreground scene thus generated may be saved in analog or digital format in a conventional manner. The pre-rendered three-dimensional background 12 and foreground 16 scenes form an image or series of images that make up the three-dimensional background and foreground layers of the virtual three-dimensional presentation 10.

Figure 7:
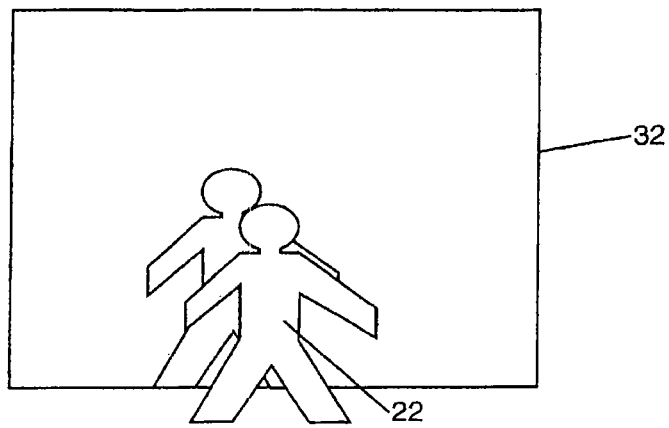
FIG. 7 is an exemplary illustration of an object (person) positioned in front of a chroma-key wall for providing a two-dimensional video insert signal and key employed in generating a virtual three-dimensional presentation in accordance with the present invention.

As illustrated in FIG. 7, the two-dimensional video insert layer 14 is generated in a conventional manner using a chroma-key wall 32 and keyer. The chroma-key wall 32 is conventional, and may include both a back wall and a floor colored in the key color or pattern. A presenter 22, or other objects or elements in the two-dimensional video insert layer 14, is positioned in front of the chroma-key wall 32. Using a conventional video camera, a two-dimensional video signal of the person 22 in front of the wall 32 is generated. The two-dimensional video signal includes a key signal that allows the two-dimensional video objects, such as the person 22, to be incorporated into the virtual three-dimensional presentation 10, to be isolated. The two-dimensional video signal may be inserted in real time into the virtual three-dimensional presentation 10, or recorded for later insertion into the virtual three-dimensional presentation.

In accordance with the present invention, a virtual three-dimensional presentation 10 is formed by compositing the two-dimensional insert video and key signal 14 with the pre-rendered three-dimensional background 12 and foreground 16 scenes. Any conventional method for compositing image layers may be employed. For example, the virtual three-dimensional presentation 10 may be formed by first compositing the two-dimensional insert video and key signal 14 over the pre-rendered three-dimensional background scene 12, and then compositing the pre-rendered three-dimensional foreground scene 16 and transparency key on top of the composite of the two-dimensional video insert layer 14 and background 12. Of course, these compositing steps may be performed in any order.

To create a realistic virtual three-dimensional presentation 10, the compositing method employed should make use of the foreground transparency key such that objects in the background and insert video layers are visible through transparent foreground objects.

Color adjustment of rendered foreground layer objects may also be required to create a realistic virtual three-dimensional presentation 10. The best compositing process to be employed may depend on the process used to render the three-dimensional background 12 and foreground 16 scenes, and, particularly, the degree of control of the rendering process available. For example, post-processing of the rendered foreground scene may be required, before or as part of the compositing process, to obtain the foreground transparency key and required color adjustment, if such parameters cannot be controlled as part of the rendering process itself. Those skilled in the art will be able to select the appropriate compositing process to be employed to obtain the quality of presentation desired.

Figure 8:
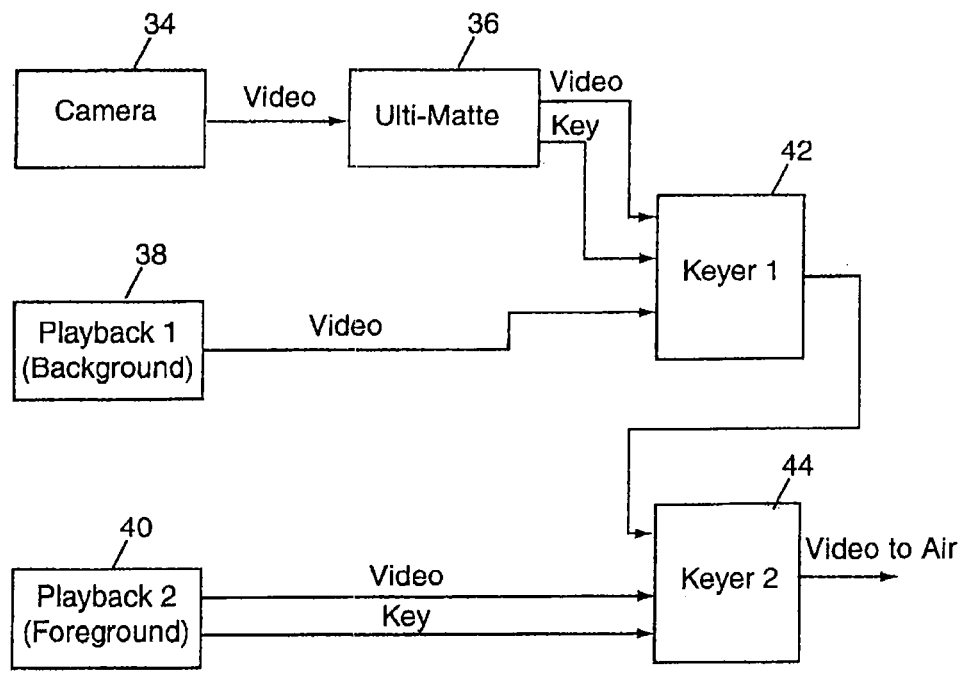
FIG. 8 is a schematic block diagram of an exemplary on-air system for generating a virtual three-dimensional presentation in accordance with the present invention.

An exemplary system for combining the pre-rendered three-dimensional background 12 and foreground 16 scenes with a live two-dimensional video layer 14 to form a complete high-quality virtual three-dimensional presentation 10 in accordance with the present invention is illustrated by the schematic block diagram of FIG. 8. When the background 12, live video 14, and foreground 16 are to be composited into the combined virtual three-dimensional presentation 10, e.g., at air time of a live news broadcast, the presenter 22, or other live video layer object, is positioned in front of the chroma-key wall 32. A camera 34 generates a live video signal including the presenter 22 and the key of the chroma-key wall 32. (Optionally, the insert video may be played back from an analog or digital recording.) This video signal is provided to a device 36, such as an Ulti-Matte system, which provides, as an output thereof, live video of the presenter 22 in front of the chroma-key wall 32 and a chroma-key signal. Simultaneously, the pre-rendered three-dimensional background scene 12 is played back using a background layer playback device 38. The background playback device 38 may be any conventional video playback device, such as a video disk player/recorder and/or a Genesis system. The live video provided by the camera 34 and the played back background scene 12, from background layer playback device 38, is provided to a device for forming a first composite of the two video elements. For example, the video and key from the live video camera 34 may be provided to a first keyer device 42 along with the background scene 12 from the background layer playback device 38. In the first keyer device 42, each pixel of live video from the camera 34 containing the chroma-key is replaced with a corresponding pixel of the background scene 12. Thus, the presenter 22 or other live video object in the two-dimensional video insert layer 14 will appear in front of the background scene 12. The combined background/two-dimensional video composite scene generated by the first keyer 42 is then provided to a second keyer device 44, wherein the combined background/two-dimensional video composite scene is composited with the prerendered foreground scene 16 played back from a foreground layer playback device 40. In the second keyer 44, pixels of the background/two-dimensional video composite signal from the first keyer 42 are replaced by selected pixels of the three-dimensional foreground video scene 16. The "density" of pixel replacement (or the degree of mixing between layers) by the second keyer 44 is defined by the transparency key provided along with the foreground scene from the foreground layer playback device 40, which, as discussed above, defines the transparency of foreground objects in the three-dimensional foreground scene with respect to objects in the layers behind the foreground layer. The output of the second keyer device 44 is thus a composited virtual three-dimensional presentation which may be broadcast to air, saved to tape, etc. The keyer devices 42 and 44 may be implemented in a conventional manner. For example, the keyers 42 and 44 may be implemented using a television station's news production switcher, provided that the switcher is capable of forming a three-layer composite.

In compositing the live or recorded two-dimensional video insert layer 14 with the pre-rendered three-dimensional background 12 and foreground 16 layers, it is important that the resulting combined presentation 10 appear as a single continuous scene, without any perceptible distortion between the scene layers. Depending upon the compositing process employed, rounding and other errors may cause a perceptible distortion at the location of the Z-sphere 24 between the three-dimensional background 12 and foreground 16 layers in the virtual three-dimensional presentation 10, when the background 12 and foreground 16 layers are rendered separately and then composited together. This problem may be minimized by employing a single pre-rendered three-dimensional scene for the entire background layer 12 and all of the foreground layer 16 except for those portions of the foreground layer 16 which appear in front of objects 22 in the two-dimensional video insert layer 14. For example, the pre-rendered background scene may be rendered to include all of the three-dimensional scene 18 appearing behind the Z-sphere 24 (the background layer 12) as well as all of the three-dimensional scene 18 appearing in front of the Z-sphere 24 (the foreground layer 16). In other words, the pre-rendered "background" scene is rendered to include the entire pre-rendered three-dimensional scene 18. The foreground scene is pre-rendered, as discussed above, to include all of the foreground scene 16 appearing in front of the Z-sphere 24.

Figure 9:
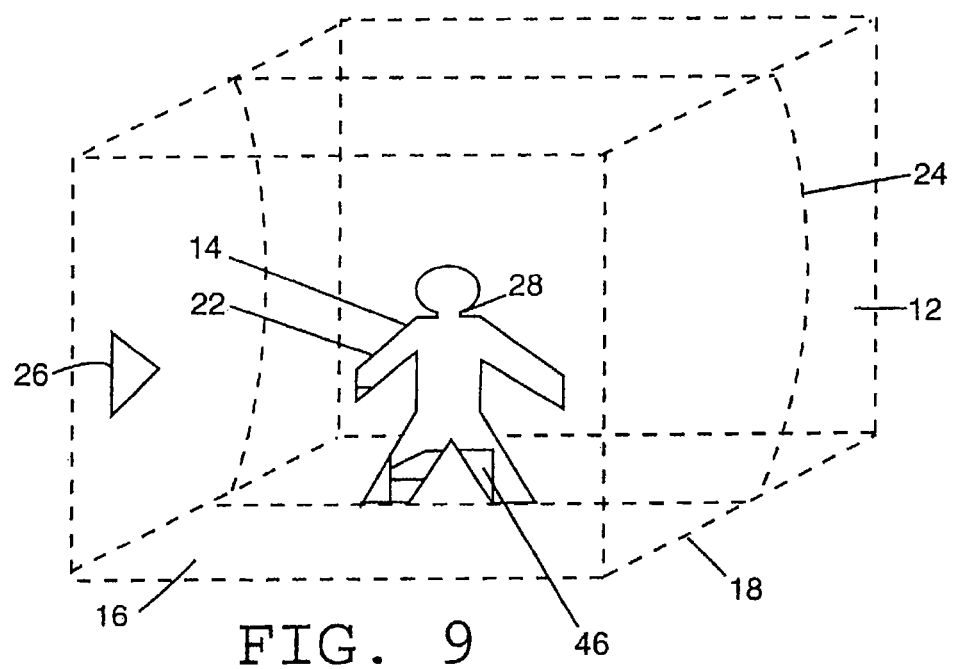
FIG. 9 is an exemplary illustration of a portion of a three-dimensional foreground scene composited over a portion of a two-dimensional video insert employed in generating a virtual three-dimensional presentation in accordance with the present invention.

During the compositing process, the pre-rendered "background" scene is used for all of the background layer scene 12 as well as all of the foreground layer scene 16 except for those portions of the foreground layer scene appearing in front of objects 22 appearing in the two-dimensional insert layer 14 being composited with the "background" scene. As illustrated in FIG. 9, only portions 46 of the foreground scene which appear in front of the objects 22 appearing in the two-dimensional insert layer 14 are composited with the background scene and insert layer to appear in the foreground layer 16. The portion 46 of the foreground scene to be used in the composite is easily determined from the two-dimensional insert video and key signal. This method provides a continuous undistorted three-dimensional presentation 10, background to foreground, in areas of the scene where two-dimensional video objects 22 are not inserted, while allowing for foreground objects to be positioned in front of two-dimensional video objects 22 in the presentation 10, such that the two-dimensional video objects 22 appear in front of objects in the background layer 12 and behind objects in the foreground layer 16.

The present invention may be employed to generate a high quality three-dimensional virtual video presentation including two-dimensional video elements placed in a pre-rendered three-dimensional scene containing a curved three-dimensional floor or base upon which the two-dimensional element is to appear to be placed. For example, a three-dimensional virtual scene may include a curved portion of the earth upon which a person, i.e., a weather presenter, in a two-dimensional video insert layer is to appear to walk. As discussed above, the two-dimensional video insert layer is produced by placing the person in front of a chroma-key wall in a chroma-key set. Typically, the floor of the chroma-key set will be flat. Thus, a person walking across the chroma-key set will appear, in the two-dimensional insert video, to be walking in a straight line.

Figure 10:
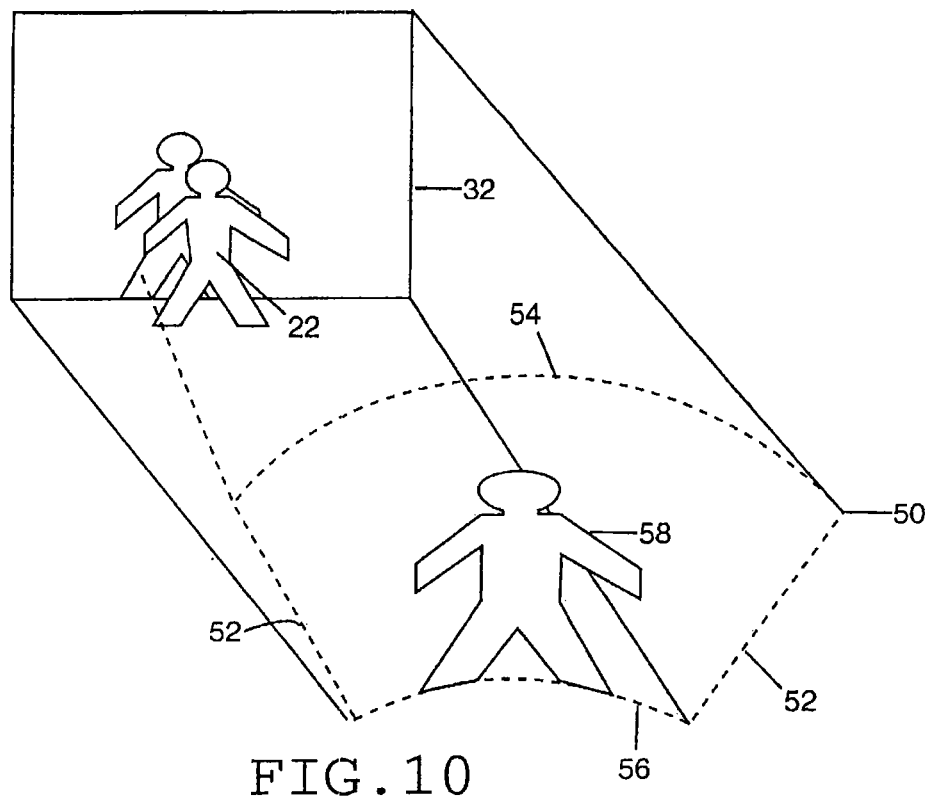
FIG. 10 is an exemplary illustration of a distorted two-dimensional insert video and key employed in generating a virtual three-dimensional presentation in accordance with the present invention wherein the three-dimensional scene of the presentation includes a curved three-dimensional floor.

In accordance with the present invention, the two-dimensional insert video, and associated key signals, may be processed before being composited with the pre-rendered three-dimensional foreground and background scenes to provide the illusion that a person is walking along a curved portion of the three-dimensional video scene. As illustrated in FIG. 10, by such processing, the two-dimensional insert video of the person 22 appearing in front of the chroma-key wall 32 is distorted into a distorted video image 50. The video insert image is distorted such that the sides 52 of the distorted image 50 are perpendicular to the arc of a sphere or other shape of, e.g., the floor of the pre-rendered three-dimensional scene in which the two-dimensional video insert is to appear. The top 54 and bottom 56 of the distorted image 50 are also distorted to match the shape of the virtual three-dimensional floor in the virtual three-dimensional scene. The image 58 of the presenter 22 in the distorted two-dimensional video insert 50 is distorted only slightly by this process, such that distortion of the image 58 of the presenter 22 is not noticeable.

Figure 11:
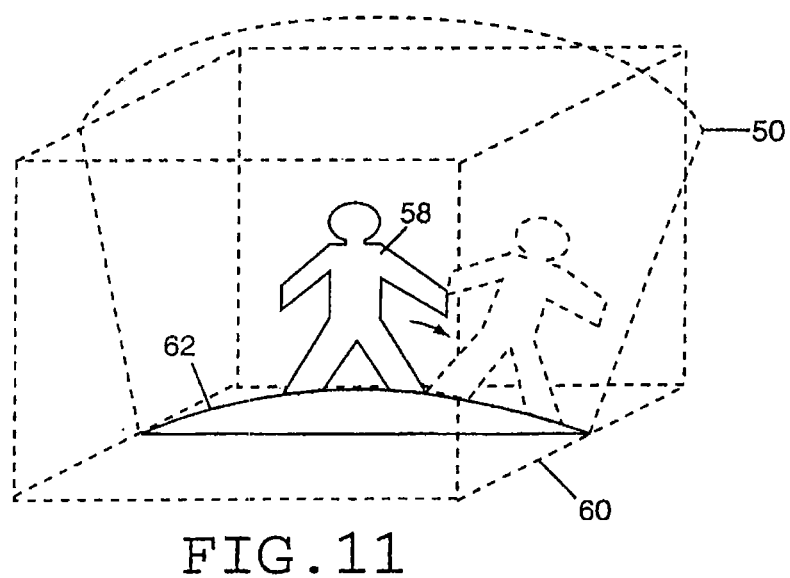
FIG. 11 is an exemplary illustration of the distorted two-dimensional insert video of FIG. 10 composited with a three-dimensional scene containing a curved three-dimensional floor.

As illustrated in FIG. 11, the distorted two-dimensional insert video 50 may be composited with three-dimensional foreground and background scenes forming a three-dimensional scene 60 having a curved floor 62, in the manner described above. As the image 58 of the presenter moves side to side through the scene 60, it will appear to follow the curvature of the floor 62 of the three-dimensional scene 60. Thus, for example, a weather presenter may be shown to move through a three-dimensional virtual weather presentation including a map showing the curvature of the earth, and will appear to follow the curvature of the earth as the presenter moves through the scene. It should be noted that by distorting the two-dimensional insert video in other ways, a two-dimensional video element may appear to follow other three-dimensional floor shapes, other than a sphere or arc. The technique of distorting the two-dimensional insert video scene to follow the three-dimensional floor of a pre-rendered three-dimensional scene with which the two-dimensional video insert is to be combined in accordance with the present invention may be accomplished without any additional hardware requirements.

In a virtual three-dimensional presentation 10 generated in accordance with the present invention, a presenter 22 or other two-dimensional video object appears to be within the three-dimensional space of a rendered scene. The presenter 22 may move through the scene 10, and the illusion will be maintained. Since the background and foreground layer scenes are pre-rendered, a very high quality virtual three-dimensional presentation may be produced. Also, as should be apparent from the foregoing description, a weathercast or other live television broadcast incorporating a virtual three-dimensional presentation generated in accordance with the present invention may be produced and aired using a minimal amount of additional equipment, and methods currently employed in such broadcasts, with minimal modifications required.

It should be understood that the present invention may be employed to produce a virtual three-dimensional presentation including multiple two-dimensional video insert layers. Multiple Z-spheres may be defined, one for each two-dimensional insert layer, which divide a three-dimensional scene into more than two background, foreground, and intermediate layers. Each such defined three-dimensional layer may be pre-rendered, and composited with the multiple two-dimensional insert layers, created as described above, to create a complex virtual three-dimensional presentation.

Figure 12:
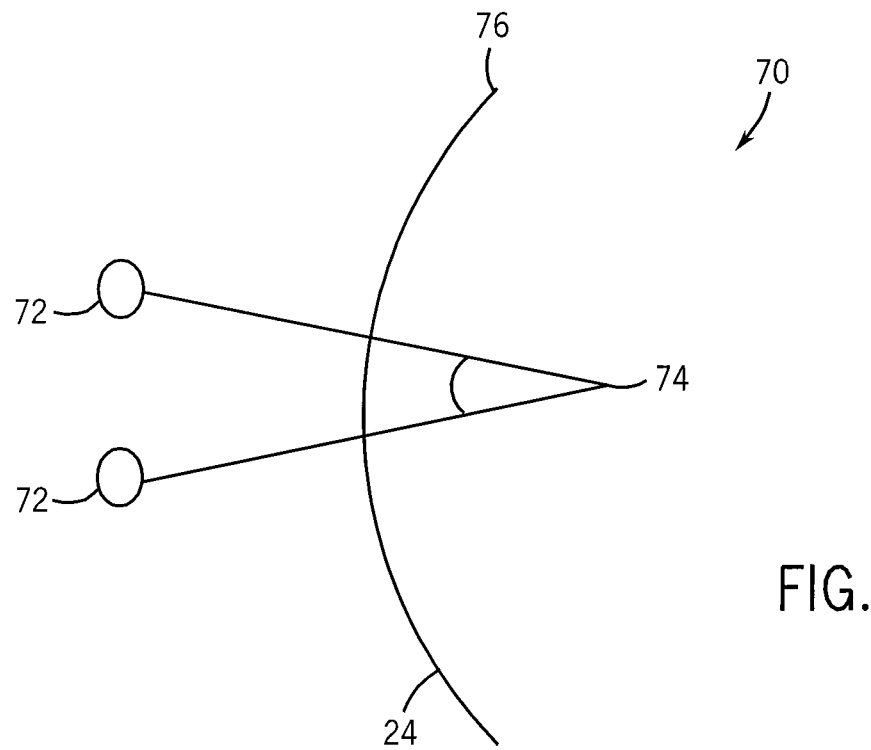
FIG. 12 is an exemplary illustration of a three-dimensional scene with a Z-sphere surface dividing the scene into three-dimensional background and foreground scenes using stereoscopic cameras.

As illustrated in FIG. 12, an exemplary illustration 70 of a three-dimensional scene with a Z-sphere surface 24 dividing the scene into three-dimensional background and foreground scenes using stereoscopic cameras 72. The foreground/background boundary 24 may be at the stereoscopic video insert surface 76 and not the aim point 74.

Figure 13:
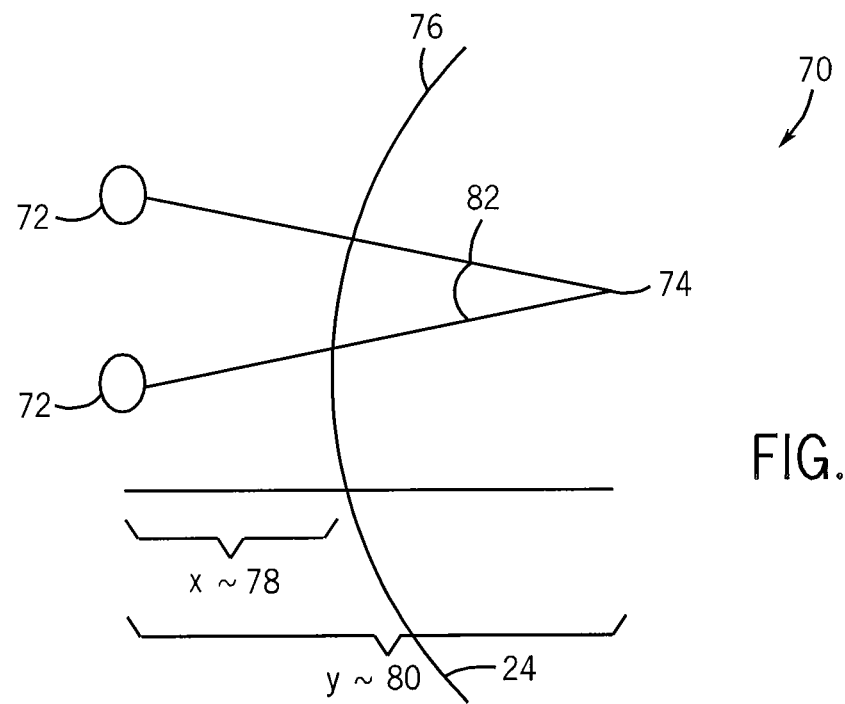
FIG. 13 is an exemplary illustration of the three-dimensional scene of FIG. 12 with a Z-sphere surface dividing the scene into three-dimensional background and foreground scenes illustrating camera distances from the divide and aim point.

FIG. 13 is an exemplary illustration of the three-dimensional scene 70 of FIG. 12 with a Z-sphere 24 surface dividing the scene into three-dimensional background and foreground scenes illustrating camera 72 insert distance 78 to the insert surface 76 and aim distance 80 to the aim point 74 and camera angle 82 relative to the aim point 74. The stereoscopic insert surface 76 may be positioned at the same distance 78 as the actual distance from the camera to the video being inserted. The angle 82 of the real cameras and the computer cameras may be configured to match. The ration of distance 78 to distance 80 in the video of the talent in front of the blue screen may also be configured to match the insertion point of that layer.

It is understood that the present invention is not limited to the particular embodiments, examples, and applications illustrated and described herein, but embraces all such modified forms thereof as come within the scope of the following claims.

What is claimed is:

1. A computer-implemented method for generating a virtual video presentation, comprising the steps of:
  (a) defining a surface within a three-dimensional space of a virtual three dimensional scene to be rendered, the surface dividing the virtual three-dimensional scene into a virtual three-dimensional background scene to be rendered and a virtual three-dimensional foreground scene to be rendered;

(b) rendering the virtual three-dimensional background scene to be located behind the surface within the virtual video presentation;
(c) rendering the virtual three-dimensional foreground scene to be located in front of the surface within the virtual video presentation;
(d) generating two stereoscopic insert videos and key signals using at least two virtual video cameras defining an aim point that is positioned within the virtual three-dimensional background scene, wherein the aim point is not on the surface dividing the virtual three-dimensional scene into the virtual three-dimensional background scene to be rendered and the virtual three-dimensional foreground scene to be rendered; and
(e) compositing the stereoscopic insert videos and key signals, the rendered virtual three-dimensional background scene, and the rendered virtual three-dimensional foreground scene together to form the virtual video presentation, wherein each of the stereoscopic insert videos appears in front of the three-dimensional background scene and the three dimensional foreground scene appears in front of each of the stereoscopic insert videos and the three-dimensional background scene.

2. The method of claim 1, wherein the step of defining the surface within the three dimensional space of a virtual three-dimensional scene to be rendered includes the step of defining a Z-sphere, wherein the Z-sphere is defined by the aim point.

3. The method of claim 2, wherein the two virtual video cameras are spaced apart and focus on the aim point to define a camera angle.

4. The method of claim 1, wherein the step of rendering the virtual three dimensional background scene includes the step of rendering an animated three dimensional background scene using a computer and the step of rendering the virtual three-dimensional foreground scene includes the step of rendering an animated three dimensional foreground scene using a computer.

5. The method of claim 4, wherein the three-dimensional animated background scene and the three-dimensional animated foreground scene are three-dimensional animated weather scenes.

6. The method of claim 1, wherein the steps of rendering the virtual three dimensional background scene and rendering the virtual three-dimensional foreground scene are performed separately.

7. The method of claim 1, wherein the steps of rendering the virtual three dimensional background scene and rendering the virtual three-dimensional foreground scene are completed before the step of compositing the stereoscopic insert videos and rendered virtual three-dimensional background and foreground scenes to form the virtual video presentation.

8. The method of claim 1, wherein the step of rendering the virtual three dimensional background scene includes the step of rendering a background scene to be located both behind and in front of the surface within the virtual video presentation, and
wherein the step of compositing the stereoscopic insert videos and key signals, the rendered virtual three-dimensional background scene, and the rendered virtual three dimensional foreground scene includes the step of compositing a portion of the background scene to be located behind the surface within the virtual video presentation and a portion of the background scene to be located in front of the surface within the virtual video presentation but not in front of the stereoscopic insert videos.

9. The method of claim 1, wherein the step of generating the stereoscopic insert videos and key signals includes a step of generating live stereoscopic insert videos and key signals for compositing in real time with the rendered virtual three-dimensional background and foreground scenes.

10. The method of claim 1, wherein the step of generating the stereoscopic insert videos and key signals includes steps of positioning an object in front of a chroma-key wall and generating the stereoscopic insert videos using two video cameras for taking a video image of the object in front of the chroma-key wall.

11. The method of claim 1, further comprising a step of broadcasting the virtual video presentation while performing the step of compositing the stereoscopic insert videos and key signals, the rendered virtual three-dimensional background scene, and the rendered virtual three-dimensional foreground scene to form the virtual video presentation.

12. The method of claim 1, further comprising a step of distorting the stereoscopic insert videos and key signals before compositing the stereoscopic insert videos and key signals with the rendered virtual three-dimensional background and foreground scenes.

13. The method of claim 12, wherein the step of distorting the stereoscopic insert videos and key signals includes the step of distorting the stereoscopic insert videos and key signals such that sides of stereoscopic insert video images defined by the stereoscopic insert videos and key signals are perpendicular to an arc and a top and bottom of the stereoscopic insert video images are distorted into arch shapes.

14. The method of claim 13 wherein the virtual three-dimensional scene includes an arc shaped floor image corresponding to the arc shape of the bottom of the stereoscopic insert video images and wherein the step of compositing the stereoscopic insert videos and key signals with the rendered virtual three-dimensional background scene and the rendered virtual three-dimensional foreground scene to form the virtual video presentation forms a virtual video presentation wherein the bottom of the distorted stereoscopic insert video images appears adjacent to the arc shaped floor image.

15. An apparatus for generating a stereoscopic virtual video presentation, comprising:
(a) a scene generation engine for defining a surface within a three-dimensional space of a virtual three-dimensional scene to be rendered, the surface dividing the virtual three-dimensional scene into a virtual three-dimensional background scene to be rendered and a virtual three-dimensional foreground scene to be rendered;
(b) a video rendering computer system for rendering the virtual three-dimensional background scene to be located behind the surface within the virtual video presentation and rendering the virtual three-dimensional foreground scene to be located in front of the surface within the virtual video presentation;
(c) a camera system for generating a stereoscopic insert video and key signal using at least two virtual cameras defining an aim point that is positioned within the virtual three-dimensional background scene, wherein the aim point is not on the surface dividing the virtual three-dimensional scene into the virtual three-dimensional background scene to be rendered and the virtual three-dimensional foreground scene to be rendered; and
(d) a video compositing system for compositing the stereoscopic insert video and key signal, the rendered virtual three-dimensional background scene, and the rendered virtual three dimensional foreground scene, to form a stereoscopic virtual video presentation wherein the stereoscopic insert video appears in front of the three-dimensional background scene and the three dimensional foreground scene appears in front of the stereoscopic insert video and the three dimensional background scene.

16. The apparatus for generating a virtual video presentation of claim 15, wherein the scene generation engine further defining a Z-sphere, wherein the Z-sphere is defined by the aim point.

17. The apparatus for generating the stereoscopic virtual video presentation of claim 16, wherein the two cameras are spaced apart and focused on the aim point to define a camera angle.

18. The apparatus for generating a virtual video presentation of claim 15, wherein the camera system for generating the insert video and key signal is further configured for generating live insert video and key signals for compositing in real time with the rendered virtual three-dimensional background and foreground scenes.

19. The apparatus for generating the stereoscopic virtual video presentation of claim 15, wherein the scene generation engine is further configured for generating a foreground transparency key signal representing a transparency of foreground objects in the foreground scene and wherein the video compositing system is further configured for employing the foreground transparency key signal when compositing the rendered virtual three-dimensional foreground scene with the rendered virtual three-dimensional background scene and the insert video and key signal such that a portion of the insert video is visible through the foreground objects in the virtual video presentation.

20. A computer-implemented method for generating a virtual video presentation, comprising the steps of:

(a) defining a surface within a three-dimensional space of a virtual three dimensional scene to be rendered, the surface dividing the virtual three-dimensional scene into a virtual three-dimensional background scene to be rendered and a virtual three-dimensional foreground scene to be rendered;

(b) rendering the virtual three-dimensional background scene to be located behind the surface within the virtual video presentation;

(c) rendering the virtual three-dimensional foreground scene to be located in front of the surface within the virtual video presentation;

(d) generating a stereoscopic insert video and key signal using at least two virtual cameras defining an aim point that is positioned within the virtual three-dimensional background scene, wherein the aim point is not on the surface dividing the virtual three-dimensional scene into the virtual three-dimensional background scene to be rendered and the virtual three-dimensional foreground scene to be rendered; and (e) compositing the stereoscopic insert video and key signal, the rendered virtual three-dimensional background scene, and the rendered virtual three-dimensional foreground scene together to form a first perspective virtual video presentation and a second perspective virtual video presentation wherein the stereoscopic insert video appears in front of the three-dimensional background scene and the three-dimensional foreground scene appears in front of the stereoscopic insert video and the three-dimensional background scene in the virtual video presentations.

* * * * *